United States Patent [19]
Cleveland

[11] 3,897,481
[45] July 29, 1975

[54] N-CARBALKOXYALKYLDITHIO UREAS
[75] Inventor: James D. Cleveland, Albany, Calif.
[73] Assignee: Chevron Research Company, San Francisco, Calif.
[22] Filed: Nov. 30, 1973
[21] Appl. No.: 420,726

Related U.S. Application Data
[63] Continuation-in-part of Ser. No. 250,895, May 8, 1972, Pat. No. 3,857,883.

[52] U.S. Cl.......... 260/470; 260/468 G; 260/468 J; 260/481 R; 71/98
[51] Int. Cl............................................ C07c 149/42
[58] Field of Search............................ 260/470, 516

[56] References Cited
UNITED STATES PATENTS
| | | | |
|---|---|---|---|
| 2,884,317 | 4/1959 | Harris................................. | 260/470 |
| 3,808,262 | 4/1974 | Zeeh et al........................... | 260/516 |
| 3,812,209 | 5/1974 | Brown............................. | 260/453 R |

FOREIGN PATENTS OR APPLICATIONS
| | | |
|---|---|---|
| 46-70019 | 9/1971 | Japan |
| 2,061,873 | 6/1971 | France................................. 260/470 |

Primary Examiner—John F. Terapane
Attorney, Agent, or Firm—J. A. Buchanan, Jr.; John Stoner, Jr.; Raymond Owyang

[57] ABSTRACT

N-carbalkoxyalkyldithio urea compounds of the formula

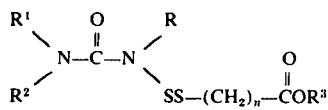

wherein R, R¹ and R² individually are hydrogen, alkyl, alkoxy, cycloalkyl, carbocyclic aryl optionally substituted with halogens, trihalomethyl, nitro or alkoxy groups, R³ is alkyl and n is 1 or 2, are used as herbicides.

9 Claims, No Drawings

N-CARBALKOXYALKYLDITHIO UREAS

RELATED APPLICATION

This application is a continuation-in-part of application Ser. No. 250,895, filed May 8, 1972, now U.S. Pat. No. 3,857,883. The disclosure of application Ser. No. 250,895 is incorporated herein by reference.

DESCRIPTION OF THE PRIOR ART

U.S. Pat. No. 3,539,538, issued Nov. 10, 1970, to M. Behforouz, and Belgian Pat. No. 775,061, granted Nov. 30, 1971, to Chevron Research Company, disclose N-alkyldithio- and N-aryldithio-substituted urea compounds.

DESCRIPTION OF THE INVENTION

The N-carbalkoxyalkyldithio urea compounds of the invention are represented by the formula (I)

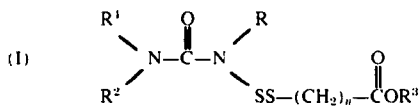

wherein R, $R^1$ and $R^2$ are hydrogen, alkyl of 1 to 6 carbon atoms, cycloalkyl of 3 to 10 carbon atoms, preferably 5 to 6 carbon atoms, carbocyclic mononuclear or binuclear aryl of 6 to 10 carbon atoms optionally substituted with 1 to 4 fluoro, chloro, bromo, trifluoromethyl, trichloromethyl, nitro or alkoxy of 1 to 4 carbon atoms; $R^3$ is alkyl of 1 to 6 carbon atoms; and n is 1 or 2.

Representative alkyl groups which R, $R^1$, $R^2$ and $R^3$ may represent include methyl, ethyl, n-propyl, isopropyl, n-butyl, t-butyl, n-pentyl and n-hexyl. The preferred alkyl group is methyl.

Representative cycloalkyl groups which R, $R^1$ and $R^2$ may represent include monocyclic groups such as cyclopropyl, cyclopentyl, cyclohexyl, 2-methylcyclohexyl, 4-methylcyclohexyl, cycloheptyl, and cyclooctyl; and bicyclic groups such as bicyclo[3.2.0]heptyl, bicyclo[2.2.1]heptyl, bicyclo[3.3.0]-octyl, bicyclo[4.2.0]octyl, bicyclo[3.3.0]octyl, and bicyclo[3.2.1]octyl. Cycloalkyl groups preferably are monocyclic groups having 5 to 6 carbon atoms.

Representative alkoxy groups which R, $R^1$ and $R^2$ may represent include methoxy, ethoxy, propoxy, butoxy, etc.

Representative hydrocarbyl aryl groups which R, $R^1$ and $R^2$ may represent include phenyl; naphthyl; alkylphenyl of 7 to 10 carbon atoms such as 2-methylphenyl, 3-methylphenyl, 4-ethylphenyl, 2,4-dimethylphenyl, 3,4-dimethylphenyl, 3-sec-butylphenyl; and phenylalkyl of 7 to 10 carbon atoms such as benzyl, 3-phenylpropyl, and 4-phenylbutyl.

Representative substituted aryl groups which R, $R^1$ and $R^2$ may represent include halo-substituted phenylalkylphenyl or phenylalkyl groups such as 2-fluorophenyl, 4-fluorophenyl, 2chlorophenyl, 3-bromophenyl, 3,4-dichlorophenyl, 4-trifluoromethylphenyl, 3-chloro-4-bromophenyl, 2-chloro-4-methylphenyl, 2-fluoro-4-methylphenyl, 4-chlorobenzyl, 4-fluorobenzyl, 2-(2-fluorophenyl)ethyl; alkoxy-substituted phenyl, alkylphenyl or phenylalkyl such as 4-methoxyphenyl, 4-ethoxyphenyl, 4-methoxy-2-methylphenyl, 4-methoxybenzyl; nitro-substituted phenyl, alkylphenyl or phenylalkyl groups such as 2-nitrophenyl, 4-nitrophenyl and 4-nitrobenzyl; and aryl groups substituted with different substituents such as 2-methoxy-4-chlorophenyl and 2-chloro-4-nitrophenyl. Substituted aryl groups preferably have 1 to 2 substituents. Preferred aryl groups are halo-substituted phenyls, especially those having 1 to 3 fluorine or chlorine substituents.

Preferably R is alkyl of 1 to 3 carbon atoms, especially methyl.

Preferably $R^1$ is phenyl or phenyl substituted with 1 to 2 fluorine, chlorine, trifluoromethyl groups, nitro groups, alkyl of 1 to 3 carbon atoms, or alkoxy of 1 to 2 carbon atoms.

Preferably $R^2$ is hydrogen or alkyl of 1 to 3 carbon atoms, more preferably methyl. The preferred $R^2$ group is hydrogen.

Representative N-carbalkoxyalkyldithio ureas of formula I are:

N-carbomethoxymethyldithio urea,
N-carbethoxyethyldithio-N-methyl urea,
N-carbopropoxymethyldithio-N,N'-dimethyl urea,
N-carbo-t-butoxymethyldithio-N-methyl-N',N'-dimethyl urea,
N-carbobutoxymethyldithio-N-methyl-N'-cyclohexyl-N'-methyl urea,
N-carbohexoxymethyldithio-N-cyclopentyl-N',N'-diethyl urea,
N-carbomethoxyethyldithio-N'-methyl-N,N'-dimethoxy urea,
N-carbomethoxymethyldithio-N-(2-norbornyl)-N'-phenyl urea,
N-carbethoxymethyldithio-N-butyl-N'-benzyl urea,
N-carbomethoxymethyldithio-N-(2-methylcyclohexyl)-N'-phenyl urea,
N-carbomethoxymethyldithio-N-methyl-N'-(2-fluorophenyl) urea,
N-carbomethoxymethyldithio-N-methyl-N'-(3,4-dichlorophenyl) urea,
N-carbomethoxymethyldithio-N-(3-trifluoromethylphenyl)-N',N'-dimethyl urea,
N-carbomethoxymethyldithio-N-phenyl-N'-N'-dimethyl urea,
N-carbomethoxymethyldithio-N-(3,4-dichlorophenyl)-N'-methoxy-N'-methyl urea,
N-carbomethoxymethyldithio-N-(3-chloro-4-bromophenyl)-N'-methoxy-N'-methyl urea,
N-carbomethoxymethydithio-N--(4-bromophenyl)-N,N'-dimethoxy urea,
N-carbomethoxymethyldithio-N-(3,4-dichlorophenyl)-N'-methyl-N-butyl urea,
N-carbomethoxymethyldithio-N-(4-chlorophenyl)-N',N'-dimethyl urea,
N-carbomethoxymethyldithio-N-(hexahydro-4,7-methanoinden-5-yl)-N',N'-dimethyl urea,
N-carbomethoxymethyldithio-N-(2-fluorophenyl)-N'-phenyl-N'-methyl urea,
N-carbomethoxymethyldithio-N-(2-fluorophenyl)-N'-benzyl-N'-methyl urea,
N-carbomethoxymethyldithio-N-(2-fluoro-4-methylphenyl)-N'-(2-fluorophenyl)-N'-methyl urea,
N-carbomethoxymethyldithio-N-methyl-N'-(4-nitrophenyl)-N'-methyl urea,
N-carbomethoxyethyldithio-N-methyl-N'-(4-methoxyphenyl)-N'-methyl urea,
N-carbomethoxymethyldithio-N-(3,4-dichlorophenyl)-N',N'-dimethylurea, N-carbomethoxymethyldithio-N-(2-fluorophenyl)-
N',N'-dimethyl urea,
N-carbomethoxymethyldithio-N-(4-methoxybenzyl)-
N',N'-dimethyl urea, and
N-carbomethoxymethyldithio-N-(2-methylphenyl)-
N',N'-dimethyl urea.

The N-carbalkoxyalkyldithio ureas are prepared from an N-chlorothio urea and a mercaptoalkanoate ester, as depicted in the following equation (1):

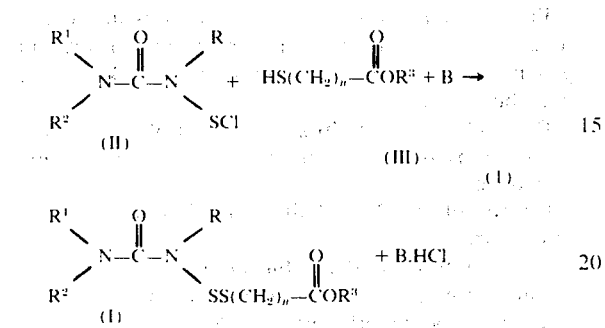

wherein R, R¹, R² and R³ and n have the same significance as previously defined, and B is an acid acceptor.

The acid acceptor is an inorganic base, e.g., alkali metal hydroxide, bicarbonate or carbonate, or an organic nitrogen base such as a pyridine compound or a trialkylamine. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine. The preferred acid acceptors are pyridine compounds, especially pyridine.

The N-chlorothio urea reactant (II) and the mercaptoalkanoate ester (III) are employed in substantially equimolar amounts, e.g., the molar ratio of the N-chlorothio urea reactant (II) to the mercaptoalkanoate ester (III) generally varies from about 1.5:1 to 1:1.5, although molar ratios of (II) to (III) of about 1.2:1 to 1:1.2 are preferred. The molar ratios of acid acceptor to the N-chlorothio urea reactant are also substantially equimolar, e.g., the molar ratio of acid acceptor to N-chlorothio urea reactant varies from about 1.5:1 to 1:1.5, although molar ratios of acid acceptor to N-chlorothio urea reactant of about 1.2:1 to 1:1.2 are preferred.

The reaction is generally accomplished by reacting the N-chlorothio urea reactant (II) and the mercaptoalkanoate (III) in the presence of the acid acceptor in the liquid phase in an inert diluent. Suitable inert diluents for the reaction include alkanes of 5 to 10 carbon atoms, such as hexane, isooctane and decane; aromatic compounds such as benzene and chlorobenzene; oxygenated hydrocarbons such as acyclic alkyl ethers, e.g. dimethoxyethane and dibutyl ether; and cycloalkyl ethers, e.g., dioxane; tetrahydrofuran and tetrahydropyran. Other suitable diluents include nitriles such as acetonitrile and propionitrile; dialkylamides such as dimethylformamide and dialkylsulfoxides such as dimethylsulfoxide. Preferred diluents are chlorinated hydrocarbons of 1 to 2 carbon atoms, such as methylene dichloride, chloroform, carbon ethylene and ethylenle dichloride. Generally, the amount of diluent employed ranges from 1 to 50 mols per mol of N-chlorothio urea reactant.

The reaction is suitably conducted at a temperature between −20°C and the boiling point of the diluent, although temperatures between 0°C and 50°C are preferred. The reaction is conducted at or above atmospheric pressure.

The N-carbalkoxyalkyl urea product is recovered and purified by conventional procedures such as extraction, crystallization, chromatography, etc.

The N-chlorothiourea reactant (II) is prepared in accordance with the following equation (2):

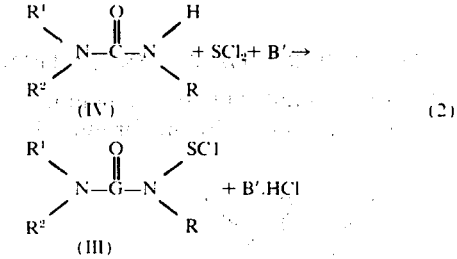

wherein R, R¹ and R² have the same significance as previously defined and B' is an acid acceptor.

The acid acceptor is an organic base such as a pyridine compound or a trialkylamine compound. The preferred acid acceptor is a pyridine compound, especially pyridine.

Generally, commercially available sulfur dichloride of reasonable purity, e.g., greater than 90–98% purity, is suitably employed. The sulfur dichloride may contain small amounts of an inhibitor such as tributylphosphate or triethylphosphate.

The sulfur dichloride and the urea (IV) are employed in substantially equimolar amounts, e.g., the molar ratio of sulfur dichloride to the urea compound generally varies from about 1.5:1 to 1:1.5, although molar ratios of sulfur dichloride to the urea compound of 1.4:1 to 1.1:1 are preferred. The molar ratios of acid acceptor to sulfur dichloride are also substantially equimolar, e.g., the molar ratio of acid acceptor to sulfur dichloride varies from about 1.5:1 to 1:1.5, although molar ratios of acid acceptor to sulfur dichloride of 1:1 to 1:1.2 are preferred.

In general, the reaction depicted in equation (2) is accomplished by reacting the urea and the sulfur dichloride in the presence of the acid acceptor compound in the liquid phase in an inert diluent, e.g., diluents employed for the reaction of the N-chlorothio urea reactant and the mercaptoalkanoate ester. The reaction is suitably conducted by adding the sulfur dichloride to a mixture of the urea and the acid acceptor in an inert diluent. Alternatively, the reaction is conducted by adding a mixture of the urea and acid acceptor to a solution of the sulfur dichloride in an inert diluent. However, the preferred method for conducting the reaction comprises reacting the urea and sulfur dichloride in the presence of a limited amount of free, uncomplexed acid acceptor. This is suitably accomplished by the addition of the acid acceptor to a substantially equimolar mixture of the urea and the sulfur dichloride so that the mols of free acid acceptor to the total mols of urea reactant and N-chlorothio urea product is less than 0.2:1, preferably less than 0.1:1, and more preferably less than 0.05:1. In other words, during the course of the reaction between the sulfur dichloride and the urea reactant, there should be at least 5 mols of the urea reactant and the N-chlorothio urea product per mol of acid acceptor which is not complexed with hydrochloric acid. Provided that the reaction is conducted with the restricted amount of acid acceptor indicated above, the contacting of the acid acceptor with the mixture of the urea and the sulfur dichloride can be conducted by a variety of procedures. In one modification, the acid acceptor is added in increments, e.g., dropwise, in an inert diluent, if desired, to a mixture of the urea and sulfur dichloride in an inert diluent. In another modification, the acid acceptor is added continuously to a mixture of the urea and sulfur dichloride in an inert diluent.

The N-chlorothio urea is suitably isolated from the reaction mixture by conventional procedures such as extraction, distillation, chromatography, etc. Alternatively, a solution of the N-chlorothio urea in the reaction diluent, preferably after removal of the acid acceptor hydrochloride salt produced in the reaction, is reacted with the mercaptoalkanoate ester according to equation (1) to produce the N-carbalkoxyalkydithio urea product of the invention.

EXAMPLES

The preparation of the N-carbalkoxyalkyldithio ureas of the invention is illustrated by the following examples.

Example 1

Preparation of
N-chlorothio-N-methyl-N'-2-fluorophenyl urea

A 5.7 g (0.055 mol) sample of sulfur dichloride was added dropwise to a mixture of 8.4 g (0.05 mol) N-methyl-N'-2-fluorophenyl urea and 4.7 g (0.06 mol) pyridine in 50 ml methylene chloride cooled in an ice bath. After the completion of the addition, the pyridine hydrochloride formed during the reaction was filtered. Hexane was added to the filtrate to precipitate some additional pyridine hydrochloride, which was removed by filtration. Evaporation of the resulting filtrate gave a clear red oil. The nuclear magnetic resonance spectrum of the oil shows an N-methyl singlet at 3.5 ppm (relative to tetramethylsilane). Elemental analysis showed: %S, calc. 13.6, found 13.6; %Cl, calc. 15.1, found 15.4.

Example 2

Preparation of
N-chlorothio-N-(3,4-dichlorophenyl)-N',N'-dimethyl urea

A 5.7 g (0.055 mol) sample of sulfur dichloride was added dropwise to a mixture of 11.7 g (0.05 mol) of N-(3,4-dichlorophenyl)-N',N'-dimethyl urea and 4.7 g (0.06 mol) pyridine in 50 ml methylene chloride cooled in an ice bath. After the completion of the addition, the pyridine hydrochloride was filtered. Hexane was added to precipitate some additional pyridine hydrochloride, which was removed by filtration. Evaporation of the resulting filtrate gave the product as a clear yellow oil. The NMR spectrum showed an N',N'-dimethyl singlet at 3.0 ppm (relative to tetramethylsilane). Elemental analysis showed:

|      | Calc. | Found |
|------|-------|-------|
| %S   | 10.7  | 10.7  |
| %Cl  | 35.6  | 35.4  |
| %C   | 36.1  | 36.4  |
| %H   | 3.0   | 3.2   |
| %N   | 9.3   | 8.7   |

Example 3

Preparation of
N-chlorothio-N-methyl-N'-3,4-dichlorophenyl urea

A 9.48 g (0.12 mol) sample of pyridine was added dropwise to a slurry of 21.9 g (0.1 mol) N-methyl-N'-(3,4-dichlorophenyl) urea and 11.3 g (0.11 mol) sulfur dichloride in 100 ml methylene dichloride at 25°–30°C. After the completion of the addition, pyridine hydrochloride was filtered from the reaction mixture. The NMR spectrum of the reaction mixture showed a singlet at 3.5 ppm (relative to tetramethylsilane) for the N-methyl group of the N-chlorothio-N-methyl-N'-3,4-dichlorophenyl urea product.

Example 4

Preparation of N-chlorothio-N,N'-dimethyl urea

Pyridine (9.48 g — 0.12 mol) was added dropwise to a solution of 8.8 g (0.1 mol) N,N'-dimethyl urea and 11.3 g (0.11 mol) sulfur dichloride at 25°–30°C. Pyridine hydrochloride was then filtered from the reaction mixture to give a solution of the N-chlorothio urea product in methylene chloride. The NMR spectrum of the product showed a singlet at 3.5 ppm for the N-methyl group and a doublet at 2.95 ppm for the N'-methyl group.

Example 5

Preparation of
N-(2-carbomethoxyethyldithio)-N-methyl-N'-(3,4-dichlorophenyl) urea N-chlorothio-N-methyl-N'-(3,4-dichlorophenyl) urea (0.1 mol) in 100 ml methylene chloride was prepared in a manner identical to Example 3. Methyl-3-mercaptopropionate (0.09 mol) and pyridine, 7.9 g (0.1 mol), dissolved in 10 ml methylene chloride was added to the chlorothio urea at 0°C. The reaction was stirred 10 minutes after the addition was completed and the mixture was washed with water, washed with sodiudm bicarbonate, dried over magnesium sulfate and evaporated under reduced pressure to yield an oil. Chromatography over silica gel (benzene eluant) yielded the product, a dark gray oil.

By a similar procedure the N-carbalkoxyalkyldithio urea compounds tabulated in Table I were prepared.

UTILITY

The N-carbalkoxyalkydithio urea compounds are, in general, herbicidal in both pre- and post-emergent applications. For pre-emergent control of undesirable vegetation, these ureas will be applied in herbicidal quantities to the environment, e.g., soil infested with seeds and/or seedlings of such vegetation. Such application will inhibit the growth of or kill the seeds, germinating seeds and seedlings. For post-emergent applications, the urea compounds will be applied directly to the foliage and other plant parts. Generally they are effective against weed grasses as well as broadleaved weeds. Some may be selective with respect to type of application and/or type of weed.

The urea compounds of the present invention can be used alone as herbicides. However, it is generally desirable to apply the compounds in herbicidal compositions comprising one or more of the herbicidal compounds intimately admixed with a biologically inert carrier. The carrier may be a liquid diluent or a solid, e.g., in the form of dust powder or granules. In the herbicidal composition, the active herbicidal compounds can be from about 0.01 to 95% by weight of the entire composition.

Suitable liquid diluent carriers include water and organic solvents, e.g., hydrocarbons such as benzene, toluene, kerosene, diesel oil, fuel oil, and petroleum naphtha. Suitable solid carriers are natural clays such as kaolinite, atalpulgite, and montmorillonite. In addition, talcs, pyrophillite, diatomaceous silica, synthetic fine silicas, calcium aluminosilicate and tricalcium phosphate are suitable carriers. Organic materials such as walnut-shell flour, cottonseed hulls, wheat flour, wood flour or redwood-bark flour may also be used as solid carriers.

The herbicidal composition will also usually contain a minor amount of a surface-active agent. Such surface agents are those commonly known as wetting agents, dispersing agents and emulsifying agents, and can be anionic, cationic or nonionic in character. The herbicidal compositions may also contain other pesticides, adjuvants, stabilizers, conditioners, fillers and the like.

The amount of herbicidal compound or composition administered will vary with the particular plant part or plant growth medium which is to be contacted, the general location of application — i.e., sheltered areas such as greenhouses, as compared to exposed areas such as fields — as well as the desired type of control. Generally, for both pre- and post-emergent control, the herbicidal compounds of the invention are applied at rates of 2 to 60 kg/ha, and the preferred rate is in the range of 5 to 40 kg/ha.

Pre- and post-emergent herbicidal tests of the urea compounds tabulated in Table I were made using the following methods:

Pre-Emergent Test

An acetone solution of the test urea compound was prepared by mixing 750 mg urea, 220 mg of a nonionic surfactant and 25 ml of acetone. This solution was added to approximately 125 ml of water containing 156 mg of surfactant.

Seeds of the test vegetation were planted in a pot of soil and the urea solution was sprayed uniformly onto the soil surface at a dose of 100 mcg per cm$^2$. The pot was watered and placed in a greenhouse. The pot was watered intermittently and was observed for seedling emergence, health of emerging seedlings, etc., for a 3-week period. At the end of this period, the herbicidal effectiveness of the urea was rated based on the physiological observations. A 0-to-100 scale was used, 0 representing no phytotoxicity and 100 representing complete kill.

Pre-Emergent Test

The test urea was formulated in the same manner as described above for the pre-emergent test. The concentration of the urea in this formulation was 5000 ppm. This formulation was uniformly sprayed on 2 similar pots of 24-day-old plants (approximately 15 to 25 plants per pot) at a dose of 100 mcg/cm$^2$. After the plants had dried, they were placed in a greenhouse and then watered intermittently at their bases as needed. The plants were observed periodically for phytotoxic effects and physiological and morphological responses to the treatment. After 3 weeks, the herbicidal effectiveness of the urea was rated based on these observations. A 0-to-100 scale was used, 0 representing no phytotoxicity and 100 representing complete kill.

The results of these tests appear in Table II. In Table II, the following abbreviations are used:

O = Wild Oats (*Avenua fatua*)
W = Watergrass (*Echinochloa crusgalli*)
C = Crabgrass (*Digitaria sanguinalis*)
M = Mustard (*Brassica arvensis*)
P = Pigweed (*Amaranthus retroflexus*)
L = Lambsquarter (*Chenopodium album*)

TABLE I

| Compound | | Melting Range, °C. | Sulfur Calc. | Elemental Analysis Sulfur Found | Halogen Calc. | Halogen Found |
|---|---|---|---|---|---|---|
| N-(2-carbomethoxyethyldithio)-N-methyl-N'-(3,4-dichlorophenyl) urea | (1) | Oil | 17.3 | 17.2 | 19.2 | (Cl) 19.6 |
| N-(carbomethoxymethyldithio)-N-methyl-N'-(3,4-dichlorophenyl) urea | (2) | 94.5–95.5 | 18.0 | 17.6 | 20.0 | (Cl) 20.0 |
| N-(carbethoxymethydithio)-N-methyl-N'-(3,4-dichlorophenyl) urea | (3) | 82–83 | 17.3 | 16.6 | 19.2 | (Cl) 18.5 |
| N-(carbomethoxymethyldithio-N-methyl-N'-3-chloro-4-bromophenyl) urea | (4) | 96–97.5 | 16.0 | 15.7 | 5.0 | (Br,Cl) 5.1 |
| N-(2-carbomethoxyethyldithio)-N-methyl-N'-(2-fluorophenyl) urea | (5) | 51–52.5 | 8.8 | 9.0(N) | — | — |
| N-(carbomethoxymethyldithio)-N-methyl-N'-2-fluorophenyl urea | (6) | Oil | 21.1 | 21.2 | 6.3 | (F) 6.2 |
| N-(2-carbomethoxyethyldithio)-N-methyl-N'-(3-chloro-4-bromophenyl) urea | (7) | Oil | 15.5 | 15.2 | 4.8 | (Br,Cl) 4.8 |
| N-(carbethoxymethyldithio)-N-methyl-N'-(3-chloro-4-bromophenyl) urea | (8) | 88.5–91.5 | 15.5 | 15.4 | 4.8 | (Br,Cl) 4.9 |

TABLE II

| Compound | Herbicidal Effectiveness - Pre-Post | | | | | |
|---|---|---|---|---|---|---|
| | O | W | C | M | P | L |
| (1) | 45/70 | 100/75 | 90/85 | 100/100 | 100/100 | 100/100 |
| (2) | 95/99 | 100/98 | 100/75 | 100/100 | 100/100 | 100/100 |
| (3) | 100/95 | 100/100 | 100/100 | 100/100 | 100/100 | 100/100 |
| (4) | 55/95 | 80/95 | 85/100 | 90/100 | 100/100 | 100/100 |
| (5) | 100/100 | 100/95 | 100/90 | 100/100 | 100/100 | 100/100 |
| (6) | 95/100 | 100/100 | 100/100 | 100/100 | 100/100 | 100/100 |
| (7) | 40/95 | 100/60 | 100/80 | 100/100 | 100/100 | 100/100 |
| (8) | 60/100 | 100/75 | 100/100 | 100/100 | 100/100 | 100/100 |

What is claimed is:

1. A urea compound of the formula $$\begin{array}{c} R^1 \\ \diagdown \\ R^2 \end{array} N - \overset{\overset{\displaystyle O}{\|}}{C} - N \begin{array}{c} R \\ \diagdown \\ SS(CH_2)_n - \overset{\overset{\displaystyle O}{\|}}{C} OR^3 \end{array}$$

wherein R, $R^1$ and $R^2$ individually are hydrogen, alkyl of 1 to 6 carbon atoms, alkoxy of 1 to 4 carbon atoms, mononuclear or binuclear aryl of 6 to 10 carbon atoms substituted with 1 to 4 fluoro, chloro, bromo, trifluoromethyl, trichloromethyl, nitro or alkoxy of 1 to 4 carbon atoms; $R^3$ is alkyl of 1 to 6 carbon atoms and $n$ is 1 or 2, with the proviso that at least one R, $R^1$ or $R^2$ group is aryl.

2. The compound of claim 1 wherein R is alkyl of 1 to 3 carbon atoms.

3. The compound of claim 1 wherein R is alkyl, $R^1$ is phenyl or phenyl substituted with 1 to 2 fluoro, chloro, trifluoromethyl, nitro, alkyl of 1 to 3 carbon atoms or alkoxy of 1 to 3 carbon atoms, and $R^2$ is hydrogen or alkyl of 1 to 3 carbon atoms.

4. The compound of claim 1 wherein R is alkyl, $R^1$ is phenyl or phenyl substituted with 1 to 2 fluoro or chloro, and $R^2$ is hydrogen or alkyl of 1 to 3 carbon atoms.

5. The compound of claim 1 wherein R is methyl, $R^1$ is 2-fluorophenyl, $R^2$ is hydrogen, $R^3$ is methyl and $n$ is 1.

6. The compound of claim 1 wherein R is methyl, $R^1$ is 3,4-dichlorophenyl, $R^2$ is hydrogen, $R^3$ is methyl and $n$ is 1.

7. The compound of claim 1 wherein R is alkoxy.

8. The compound of claim 1 wherein n is 1 and R is alkyl.

9. The compound of claim 1 wherein $n$ is 2 and R is alkyl.

* * * * *

UNITED STATES PATENT AND TRADEMARK OFFICE
CERTIFICATE OF CORRECTION

PATENT NO. : 3,897,481
DATED : July 29, 1975
INVENTOR(S) : James D. Cleveland

It is certified that error appears in the above-identified patent and that said Letters Patent are hereby corrected as shown below:

Col. 3, line 67 "carbon ethylene" should read -- carbon tetrachloride --.

Col. 6, line 51 "sodiudm" should read -- sodium --.

Col. 9, lines 24-25, --mononuclear or binuclear aryl of 6 to 10 carbon atoms,-- was omitted.

Signed and Sealed this eighth Day of June 1976

[SEAL]

Attest:

RUTH C. MASON
Attesting Officer

C. MARSHALL DANN
Commissioner of Patents and Trademarks